May 8, 1928.  1,669,196
L. B. GRAHAM
STAND PIPE FOR FEEDING LOCOMOTIVES
Filed July 14, 1922
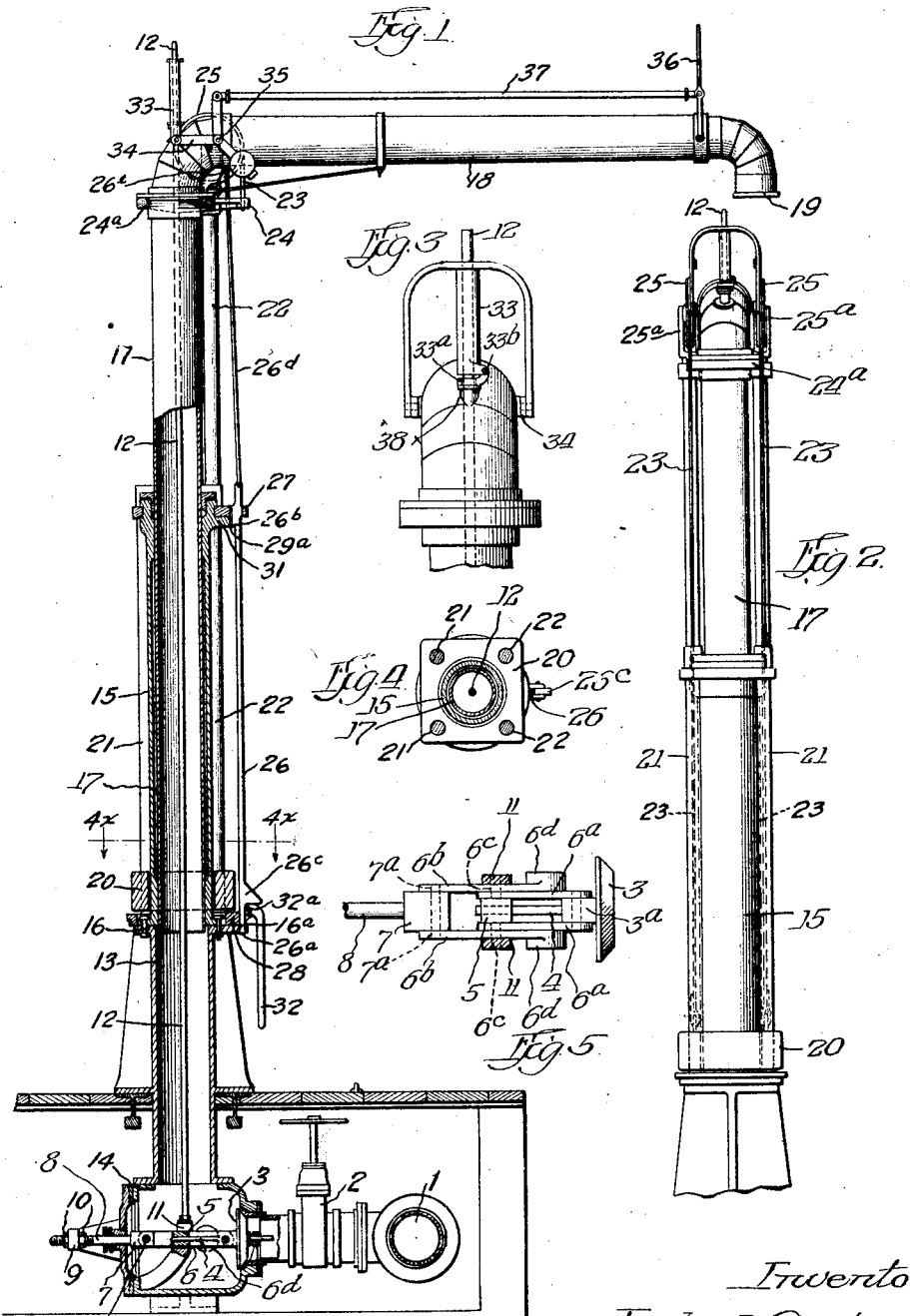

Patented May 8, 1928.

1,669,196

UNITED STATES PATENT OFFICE.

LESLIE B. GRAHAM, OF EAST CHICAGO, ILLINOIS, ASSIGNOR, BY MESNE ASSIGNMENTS, TO THE LOCOMOTIVE TERMINAL IMPROVEMENT COMPANY, OF CHICAGO, ILLINOIS, A CORPORATION OF MAINE.

STANDPIPE FOR FEEDING LOCOMOTIVES.

Application filed July 14, 1922. Serial No. 575,021.

This invention relates to a stand pipe for delivering fluid, for instance, fuel oil, to the storage tank of a locomotive, and has for its object to provide a construction of stand pipe which will automatically assume a position with its horizontal or delivery arm at an elevation to avoid obstruction to passing rolling stock, and is adapted to be telescopically depressed to bring its discharging spout into delivery relation to the locomotive tank; and to this end, one feature of the invention consists in constructing the stand pipe of telescoping members with a counterbalance and pulley connection which normally lifts one telescoping member vertically with respect to the other, but which yields under the pull of an operative to permit the discharge spout to be brought into delivery position.

Another object of the invention is to provide means whereby in telescoping stand pipe of the character described, a valve located in a lower portion of the stand pipe may be manipulated at will from the vertically telescoping upper portion thereof; and, to this end, a further feature consists in providing a valve rod which extends vertically to the movable telescoping member; also an operating lever system carrying a gripper through which said valve rod works without influence upon the valve during telescoping action, but which picks up the rod and imparts movement through the rod to the valve when the lever system is manipulated.

Still another object is to provide a construction of stand pipe which will be adapted to revolve upon its vertical axis to present its delivery arm over either of two adjoining tracks, and to have this rotary movement take place without impairing the telescoping action or the valve control; and to these ends, a further feature of the invention consists in mounting the movable telescoping member revolubly within the fixed member with which it telescopes, and also causing the counterbalancing member to revolve with the movable telescoping member; also in having the gripper through which the lever system engages the valve rod revoluble on said valve rod.

In order that the invention may be fully understood, several features thereof will be disclosed in their preferred embodiments in the accompanying drawings.

In said drawings—

Figure 1 is a sectional elevation of a stand pipe embodying the several features of the invention.

Figure 2 is a view at right angles to Figure 1.

Figure 3 is a detail view on an enlarged scale showing the relation of the valve actuating lever system to the rod which it controls.

Figure 4 is a section on the line 4$^x$—4$^x$ of Figures 1 and 2; and

Figure 5 is a detail view of a toggle device for seating and unseating the valve.

1 represents a pipe or main, for instance, one for supplying fuel oil to locomotives. 2 represents a gate valve controlling the flow of liquid from said pipe at such times when the system is to be shut off. 3 represents a valve seating against the pressure of fluid in said pipe and adapted to be moved to and from its seat by a locomotive operative when it is desired to deliver liquid from the pipe to a locomotive. For seating and unseating the valve 3, said valve is provided with a stem 4 guided in a fixed bracket arm 5, and is adapted to be moved to and from its seat by a toggle lever system 6 comprising arms 6$^a$ pivoted to the shank 3$^a$ of the valve, and a pair of arms 6$^b$ pivoted to a stationary block 7 at 7$^a$ and pivotally connected at 6$^c$ to the arms 6$^a$. Counterbalances 6$^d$ on the arms 6$^b$ normally tend to hold the toggle lever in position to seat the valve 3. Stationary block 7 carries a stem 8 passing through a bracket 9 and fixed therein by nuts 10 in a manner to be adjustable longitudinally to insure firm seating of the valve 3. Toggle lever 6 is controlled by a lifting yoke 11 which is preferably connected to the toggle lever through means of the same pintles 6$^c$ which unite the arms 6$^a$ and 6$^b$, and this yoke carries a valve rod 12 extending to the top of the stand pipe for manipulation as hereinafter described.

To convey liquid from pipe 1 to a locomotive, a stand pipe is provided which consists of a stationary section, preferably constructed of a member 13 standing on the valve housing 14, and a member 15 united to the member 13 by flange coupling 16; also a telescoping member 17 which is movable both axially and circumferentially in the member 15. Member 17 carries a laterally extending delivery arm 18 which terminates in spout 19, and its rotary movement is such as to permit the spout to be brought vertically above the intake opening of a locomotive tank; and the vertical or telescoping movement of the member 17 is to bring the spout 19 from a position non-obstructing as to rolling stock into a close delivery relation to the intake opening of the locomotive tank. The telescoping member 17 with its delivery arm 18 is normally supported at its elevated position, and is automatically moved to such position immediately upon being released from its delivery position for the combined purpose of restoring it to non-obstructing position and of enlarging the internal capacity of the telescoping members after closure of the valve 3 so as to at once arrest after flow of liquid. In order to automatically return the pipe 17 with its arm 18, as aforesaid, a counterbalance 20 is mounted to move vertically upon a plurality of guide rods 21, 21, and 22, 22, and is connected by flexible connectors 23 with a bracket 24 mounted upon section 17 through the medium of ring $24^a$; said connectors 23 being passed over pulleys 25 pivotally supported on the upper ends of the extended rods 22. The rods 22 are fixed at their lower ends in the rotating collar or plate 28 so that the collar forms a thrust bearing supporting the weight of the movable pipe, in bearing with stationary flange 16 on the supporting base.

In order to normally lock the telescoping member 17 of the stand pipe in position with its delivery arm 18 parallel to the tracks, and to release it at will and rotate it to a position with the arm 18 presented over either of two adjoining tracks, a latch bar 26 mounted to slide vertically in a pair of revoluble collars or plates 27, 28, has its lower end $26^a$ adapted to a recess $16^a$ in the fixed flange 16, and carries a shoulder $26^b$ similarly adapted to a recess $29^a$ in the fixed flange 31; and a camming lever 32 pivoted at $32^a$ upon the movable plate 28 is adapted to engage the lug $26^c$ on the bar 26 and raise said bar as said camming lever is moved to horizontal position, upon the attainment of which, the plates 27 and 28 together with the guide rods 21 and 22, the counterbalance 20, and the ring $24^a$ through which the rods 22 slide, these rods forming a support for the means carrying the ring $24^a$ in which rods 21, 22 terminate and which carries the upper movable telescoping section 17, with the parts mounted thereon, can be rotated in either direction. Latch bar 26 can be suspended by flexible connector $26^d$ attached at its upper end to the bracket $26^e$. Guide rods 22 extend vertically to the bracket ring $24^a$ upon the upper portion of the telescoping member 17, and, while working vertically through the same in the lowering and raising of the telescoping section, constitute means for imparting rotation to said telescoping section.

In order to control the toggle lever 6 of the valve 3 from a position adjacent the spout 19, a gripper 33 having a jaw $33^a$ pivoted thereon at $33^b$, surrounds the rod 12 and has a bifurcated bell crank lever 34 pivoted at 35 and under control of handle 36 through the medium of connecting rod 37. As shown more clearly in Figure 3, jaw $33^a$ rests normally upon the nipple 38 through which the rod 12 emerges from the elbow of the telescoping member 17, and so long as it rests thereon it is held normal to the rod 12 and without gripping effect thereon, and permits the telescoping member 17 to be raised or lowered without influencing the valve 3. But when the gripper 33 is raised by its lever 34 so that the jaw $33^a$ can hang downward, it develops a bite upon the rod 12 and causes the latter to respond to upward movement of the bell crank lever and to hold the valve 3 open so long as said lever is held elevated. As soon as lever 34 is released and the gripper 33 descends, the jaw $33^a$ is restored to normal position, rod 12 is released, and valve 3 closes automatically under the action of the counterweights $6^a$ of the toggle lever 6.

In Figures 1 and 2 of the drawings, the telescoping member is shown in its elevated position, which it normally assumes when released, and parallel to the tracks where it is normally located. When pulled down into delivery relation to the locomotive tank, after being swung over the track on which the locomotive stands, the pair of guide rods 22, which extend upwardly beyond the plate 27, slide vertically in the ring $24^a$ of the bracket 24 and the gripper 33 with its jaw $33^a$ slides downward upon the rod 12, and while the arm 18 is at any level of depression, gripper 33 may be actuated by handle 36 to open the valve 3 and permit the discharge of fuel oil, or other liquid, which the stand pipe is intended to deliver. As soon as arm 18 is released, counterbalance 20 will return it to its upper limit; but before this is done, handle 36 is released to permit the valve 3 to close and cut off the flow of liquid. When the flow of liquid is cut off, the arm 18 will be held until the flow from spout 19 slackens, and is then released, the elongation of the vertical columns 13, 15, 17 in which the oil is confined being sufficiently enlarged by the upward movement of the section 17 to accommodate any remanent liquid, and since the arm 18 is inclined backward toward the stand pipe, dripping will be effectually arrested.

I claim:

1. In a stand pipe, fixed and rotatable members, means for controlling the relative positions of said members in the direction of rotation, comprising plates revolubly mounted in relation to the fixed member of the stand pipe, rods connecting said plates and extending to the rotatable member, and means for imparting revolving movement to a plate.

2. In a stand pipe, fixed and movable pipe members telescopically and revolubly related, a valve carried by one of said members, valve manipulating means carried by the other of said members, and connection between said valve and manipulating means responsive to the action of the manipulating means, but permitting relative rotation and telescoping of the pipe members without operating the valve; said connection comprising a rod connected with the valve, and a gripper movable around and longitudinally of said rod when free from manipulation, but adapted to pick up said rod when manipulated.

3. In a stand pipe, fixed and movable pipe members telescopically and revolubly related, plates revolubly related to the fixed member, and guide rods extending from one plate through another plate to the movable pipe member, and enforcing identical rotation in said plates and movable pipe member; said guide rods moving relatively to said other plate in the telescoping action of the pipes.

4. In a stand pipe, fixed and movable pipe members telescopically and revolubly related, a valve carried by one of said members, valve manipulating means carried by the other of said members, and connection between said valve and manipulating means responsive to the action of the manipulating means, but permitting relative rotation and telescoping of the pipe members without operating the valve.

Signed at Chicago, Ill., this 10 day of July, 1922.

LESLIE B. GRAHAM.